United States Patent
Robertson et al.

(10) Patent No.: US 9,946,669 B2
(45) Date of Patent: Apr. 17, 2018

(54) METHOD OF AND CIRCUITRY FOR CONTROLLING ACCESS BY A MASTER TO A PERIPHERAL, A METHOD OF CONFIGURING SUCH CIRCUITRY, AND ASSOCIATED COMPUTER PROGRAM PRODUCTS

(71) Applicants: Alistair Robertson, Glasgow (GB); Carl Culshaw, Wigan (GB); Alan Devine, Paisley (GB); Andrei Kovalev, Sauerlach (DE)

(72) Inventors: Alistair Robertson, Glasgow (GB); Carl Culshaw, Wigan (GB); Alan Devine, Paisley (GB); Andrei Kovalev, Sauerlach (DE)

(73) Assignee: NXP USA, Inc., Austin, TX (US)

( * ) Notice: Subject to any disclaimer, the term of this patent is extended or adjusted under 35 U.S.C. 154(b) by 211 days.

(21) Appl. No.: 14/766,989

(22) PCT Filed: Feb. 12, 2013

(86) PCT No.: PCT/IB2013/051133
§ 371 (c)(1),
(2) Date: Aug. 11, 2015

(87) PCT Pub. No.: WO2014/125324
PCT Pub. Date: Aug. 21, 2014

(65) Prior Publication Data
US 2015/0378944 A1  Dec. 31, 2015

(51) Int. Cl.
*G06F 13/00* (2006.01)
*G06F 13/26* (2006.01)
(Continued)

(52) U.S. Cl.
CPC .............. *G06F 13/26* (2013.01); *G06F 13/24* (2013.01); *G06F 13/4022* (2013.01)

(58) Field of Classification Search
CPC ....... G06F 13/26; G06F 13/4022; G06F 13/24
See application file for complete search history.

(56) References Cited

U.S. PATENT DOCUMENTS 3,940,745 A * 2/1976 Sajeva .................... G06F 9/461
710/244
3,984,820 A * 10/1976 Stanley ................. G06F 9/4831
710/265
(Continued)

FOREIGN PATENT DOCUMENTS

WO  2003012658  12/2003

OTHER PUBLICATIONS

International Search Report and Written Opinion correlating to PCT/IB2013/051133 dated Nov. 19, 2013.

*Primary Examiner* — Jing-Yih Shyu

(57) ABSTRACT

A method of controlling access by a master to a peripheral includes receiving an interrupt priority level from an interrupt controller associated with the peripheral, comparing the interrupt priority level with respective a pre-established interrupt access level to obtain an interrupt level comparison result, establishing whether an access condition is satisfied in dependence on the interrupt level comparison result, and if the access condition is satisfied, granting access. If the access condition is not satisfied, access is denied. Further, a circuitry is described including a master, a peripheral, and an access control circuitry including an interrupt controller associated with the peripheral. The access control circuitry is arranged to perform a method of controlling access by the master to the peripheral.

15 Claims, 6 Drawing Sheets

(51) Int. Cl.
*G06F 13/24* (2006.01)
*G06F 13/40* (2006.01)

(56) References Cited

U.S. PATENT DOCUMENTS

| | | |
|---|---|---|
| 4,241,401 A | 12/1980 | De Ward et al. |
| 5,619,705 A | 4/1997 | Karnik et al. |
| 6,115,778 A * | 9/2000 | Miyake .................. G06F 13/24 |
| | | 710/260 |
| 2002/0174278 A1 | 11/2002 | Komatsu et al. |
| 2005/0132096 A1* | 6/2005 | Raghunath ............ G06F 1/3215 |
| | | 710/15 |
| 2008/0091867 A1 | 4/2008 | Plondke et al. |
| 2008/0104348 A1 | 5/2008 | Kabzinski et al. |
| 2009/0271548 A1* | 10/2009 | McAslan ............ G06F 11/0757 |
| | | 710/260 |
| 2014/0047150 A1* | 2/2014 | Marietta ................ G06F 13/14 |
| | | 710/264 |

* cited by examiner

METHOD OF AND CIRCUITRY FOR CONTROLLING ACCESS BY A MASTER TO A PERIPHERAL, A METHOD OF CONFIGURING SUCH CIRCUITRY, AND ASSOCIATED COMPUTER PROGRAM PRODUCTS

FIELD OF THE INVENTION

This invention relates to a method of and circuitry for controlling access by a master to a peripheral, a method of configuring such circuitry, and associated computer program products.

BACKGROUND OF THE INVENTION

There is a continued demand for enhanced levels of safety related features within microcontrollers having one or more masters and one or more peripherals. Currently microcontrollers implement several layers of protection between the masters and the peripherals, particularly those affecting device Input/Output (I/O) directly. Current designs have protection through, for example, the use of user/supervisor level access rights, address range based protection through a Memory Protection Unit (MPU) and a Memory Management Unit (MMU), and Process ID based protection. However, safety concerns remain, such as errant software, for example incorrect code operating at a given time, causes disruption and potentially affects I/O and a continued wish for enhanced level of safety against unwanted behaviour persists. Current designs may still be compromised due to an access by one of the masters to one of the slaves of a microcontroller that is not intended to occur, for example due to errant software executing.

SUMMARY OF THE INVENTION

The present invention provides a method of and circuitry for controlling access by a master to a peripheral, a method of configuring such circuitry, and associated computer program products as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
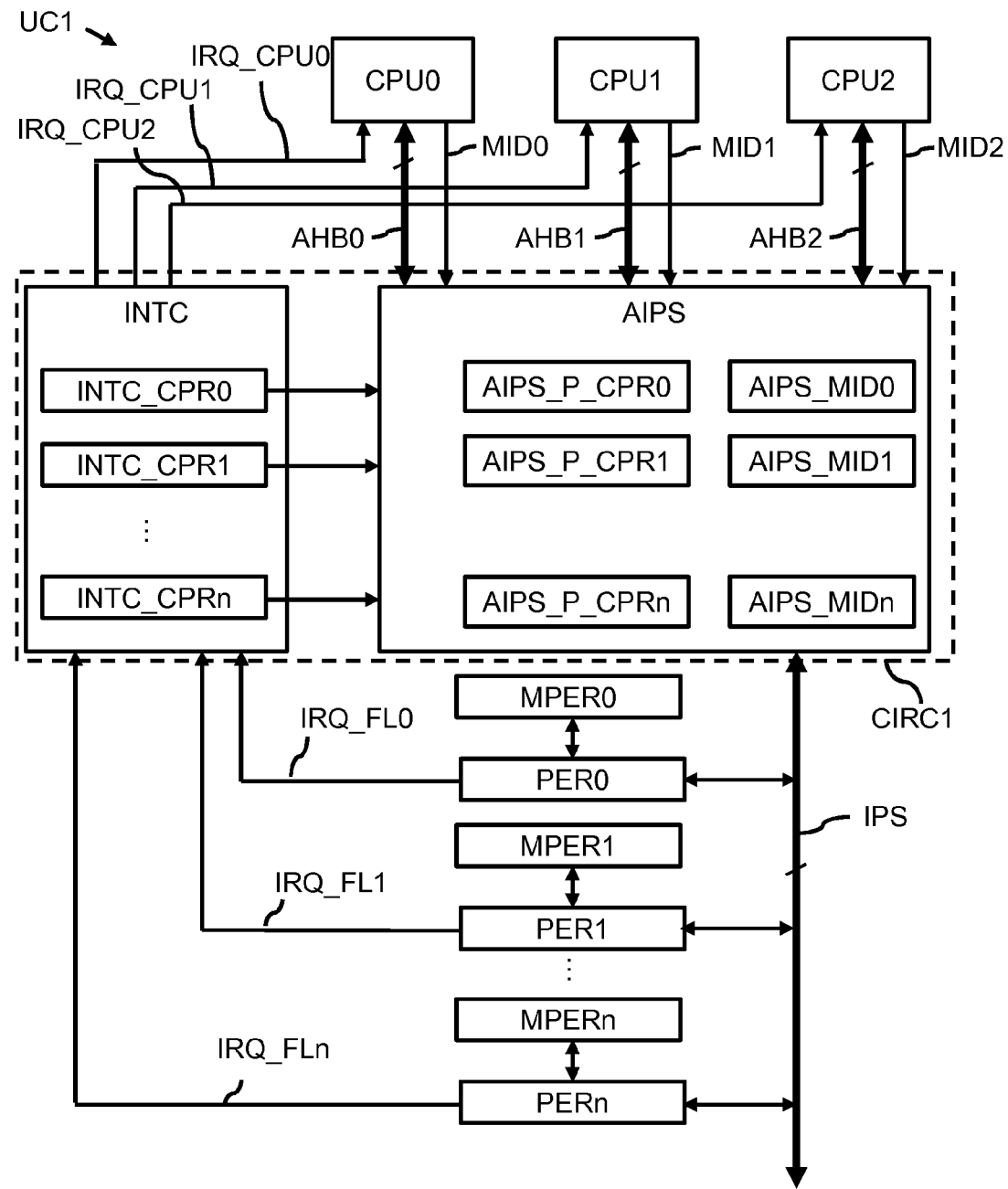
FIG. 1 schematically shows a microcontroller having one or more masters, one or more peripherals, and an access control circuitry.

FIG. 1 schematically shows a microcontroller UC1 comprising a circuitry having one or more masters, one or more peripherals PER0, PER1, PER2, and an access control circuitry CIRC1. The access control circuitry CIRC1 comprises one or more interrupt controllers, shown as interrupt controller INTC associated with the one or more peripherals PER0, PER1, PER2. The peripherals may be memory-mapped peripherals, i.e., with the peripherals being controlled with parameters settings in memory.

The three masters in FIG. 1 are shown as shown as three CPUs CPU0, CPU1, CPU2. However, a master may also be an alternative logic circuitry capable of initiating a bus transfer, such as a read and/or write of an address or memory mapped portion of a system slave's address range. A master may thus, e.g., be an Ethernet controller, a Flexray controller, a Direct Memory Access (DMA) controller, a hardware security module (HSM).

The interrupt controllers are arranged to monitor interrupt request signals from many sources throughout the microcontroller and to signal to the one or more CPUs that an interrupt requires servicing. The interrupt controllers may also be arranged to handle priority schemes, such that certain interrupt service requests may have a different priority level relative to another interrupt service requests. The interrupt controllers may be arranged to generate corresponding interrupt priority level signals.

The access control circuitry CIRC1 is arranged to control access by the masters of the one or more masters to the peripherals of the one or more peripherals. Herein the term access may relate to an access by a master to a peripheral's memory or register space.

Hereto, at least one of the masters is arranged to, when access is granted by the access control circuitry CIRC1, access at least one of the peripherals via the access control circuitry. For example, CPU CPU0 may be arranged to cooperate with peripheral PERn, when access to peripheral PERn is granted to CPU CPU0, while, for example, CPU CPU1 may be arranged to cooperate with peripheral PER1, when access to peripheral PER1 is granted to CPU CPU1.

At least one peripheral of the one or more peripherals is arranged to allow access to the peripheral by at least one master of the one or more masters. For example, peripheral PERn is arranged to allow access to itself and to its associated memory range MPERn by CPU0. Peripheral PERn may hereto be arranged to generate an interrupt request signal IRQ_FLn having a level indicating an interrupt priority (further referred to as an interrupt priority level) and provide this interrupt request signal to the access control circuitry CIRC1 for allowing the access control circuitry CIRC1 to signal master CPU CPU0 with a corresponding master interrupt signal IRQ_CPU0 (which may further also be referred to as CPU interrupt signal), to hereby indicate to the CPU CPU0 that the peripheral is ready to accept an access to its internal register or memory, its external private memory, or its address range in common memory, e.g., in common RAM. The at least one peripheral is hereby arranged to provide one or more interrupt request signals with one or more interrupt priority levels to the associated interrupt controller for allowing the interrupt controller to control access by the one or more masters to the at least one peripheral.

The interrupts may e.g. be generated in response of a reception of a valid message for a communications peripheral or a timeout of a channel for a timer module. One or more of the peripherals may be configured by a user or a host device prior to or at system start-up to generate interrupt requests upon defined conditions; for example, for a communication module the user may specify the message ID of a message that when received triggers an interrupt request.

The access control circuitry CIRC1 may be arranged to signal the at least one master that an access can be performed where access is granted by providing one or more master interrupt signals to the at least one master. Herein, the access control circuitry CIRC1 may be arranged to signal the at least one master that an access can be performed where access is granted by providing the one or more interrupt request signals as received from the at least one peripheral as one or more master interrupt signals to the at least one master. For example, the access control circuitry CIRC1 provides the interrupt request signal IRQ_FLn as CPU interrupt signal IRQ_CPU0 when granting access to peripheral PERn to CPU CPU0.

The access control circuitry CIRC1 may be further be arranged to establishing whether the access condition is satisfied in dependence on whether a specific master that wants to access a specific peripheral is actually allowed to access the specific peripheral. Hereto, the access control circuitry CIRC1 may be further be arranged to establish a master ID associated with the master, to compare the master ID with a pre-established master ID to obtain an master comparison result, and to establish whether the access condition is satisfied in further dependence on at least the master comparison result. The access control circuitry CIRC1 may be arranged to, at least during normal operation establishing the master ID from receiving the master ID from the master. Unexpected and unauthorized accesses by other devices than the master having the pre/established master ID may hereby be largely prevented.

The access control circuitry CIRC1 may be arranged to establish whether an interrupt request is pending, the interrupt request indicating that an interrupt requires servicing from the peripheral. The access control circuitry CIRC1 may then be arranged to establish whether the access condition is satisfied is performed in further dependence on whether an interrupt request from the peripheral is pending. Hereby, the access control circuitry CIRC1 may be only allow access to a specific peripheral by a specific when an interrupt request is pending from the specific peripheral. Unexpected and unauthorized accesses may hereby be largely prevented.

The access control circuitry CIRC1 may comprise an interrupt controller INTC and a bus interface, such as an AHB-to-IPS bus interface AIPS. The AHB-to-IPS bus interface may further also be referred to with the more general term bus interface, or with the term bus gasket. The AHB-to-IPS bus interface (AIPS) is arranged to interface one or more high speed system busses, such as Advanced High Speed Busses (AHBs) that connects memories and CPUs, to a low bandwidth Inter Peripheral Bus IPS that connects to and between all the peripherals PER0, PER1, PER2 like communications modules, timers, general purpose I/O, etc. Advanced High Speed Busses are shown in FIG. 1 between each of the CPUs CPU0, CPU1, CPU2 and the bus interface AIPS. The bus interface AIPS may further comprise a register interface that can be programmed to restrict access to peripheral memory address ranges based upon attributes of the bus transfer, such as a master ID. For example, the microcontroller may hereby be configured such that a specific CPU is the only master that has access to read/write the memory address range of a specific module. Similarly may the microcontroller may hereby be configured such that a specific process is the only process that has access to read/write the memory address range of a specific slave peripheral module. For example, one of the CPUs may be running a given process at a given time and have an internal register that can be written by the CPU to signal which process is running using a process ID. This register, and the contents of it, may be routed to the rest of the microcontroller as a process ID signal. This then means that other logic in the system (i.e. system slaves, system interconnects, system memory protection units) may use these process ID signals to identify the process ID that is running when performing the access and optionally apply any access restrictions.

Figure 6:
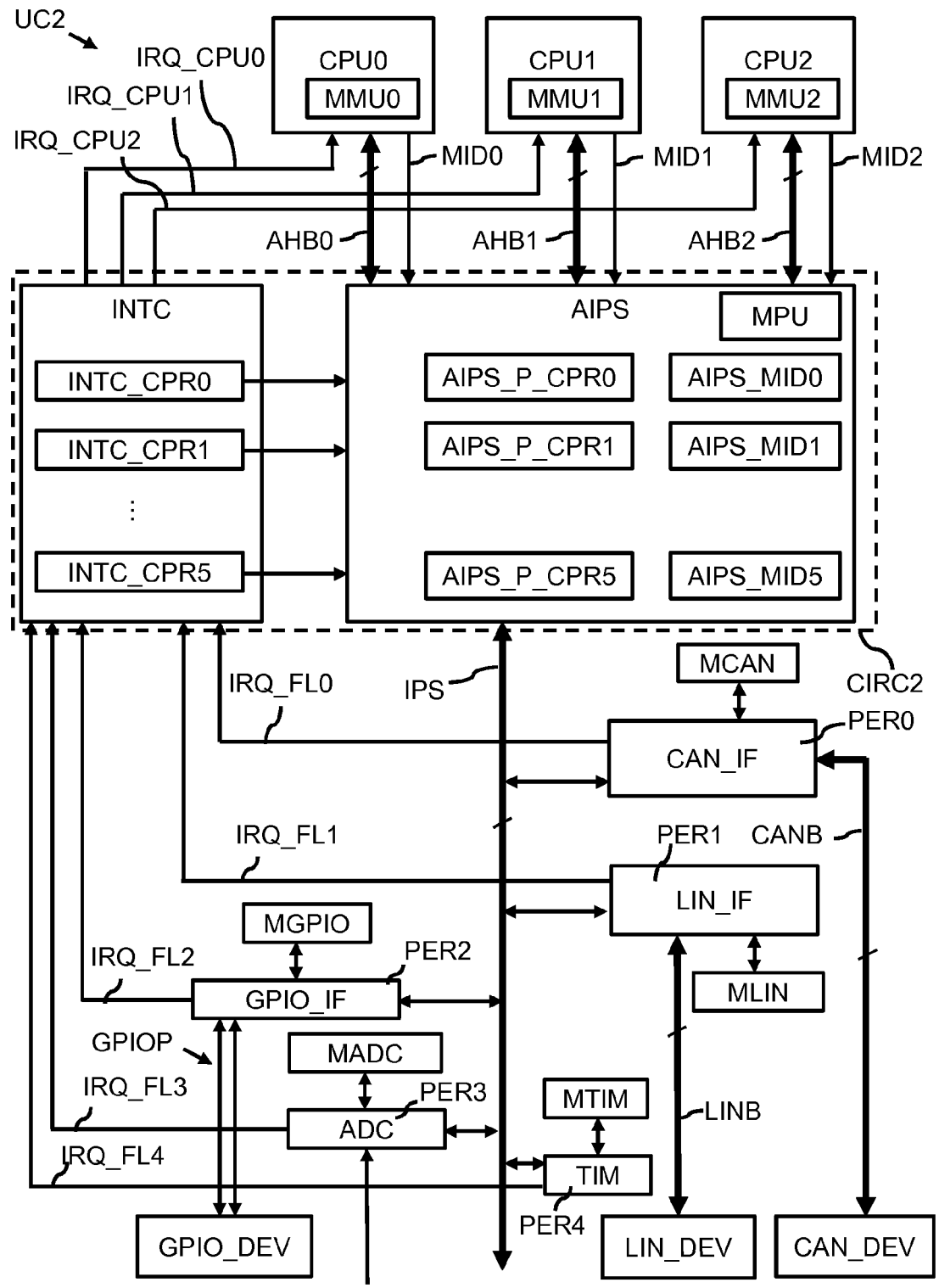
FIG. 6 schematically shows an automotive body control (ABC) microcontroller.

The bus gasket may further comprise a memory protection unit MPU (shown in FIG. 6). The MPU is capable of partitioning the memory map of the microcontroller into defined regions and setting individual protection attributes for each region. The MPU may reside in the bus gasket as shown in FIG. 6, or within or close to the system interconnects (or crossbar or switch fabric). The MPU may hereby be capable of applying attributes to multiple masters within the system.

The CPUs may comprise a memory management unit MMU (as shown in FIG. 6). The MMU may be similar to the MPU in terms of its capability to apply protection attributes to memory map address regions but differs in that it may be resident within the core, or the core's local circuitry, whereby the attribute that it applies to memory accesses may only be applied to that individual core. Further, a MMU may be capable to perform 'address translation' from translating a virtual address to a physical address, and thus effectively remap from one address space to another address space.

Figure 2A:
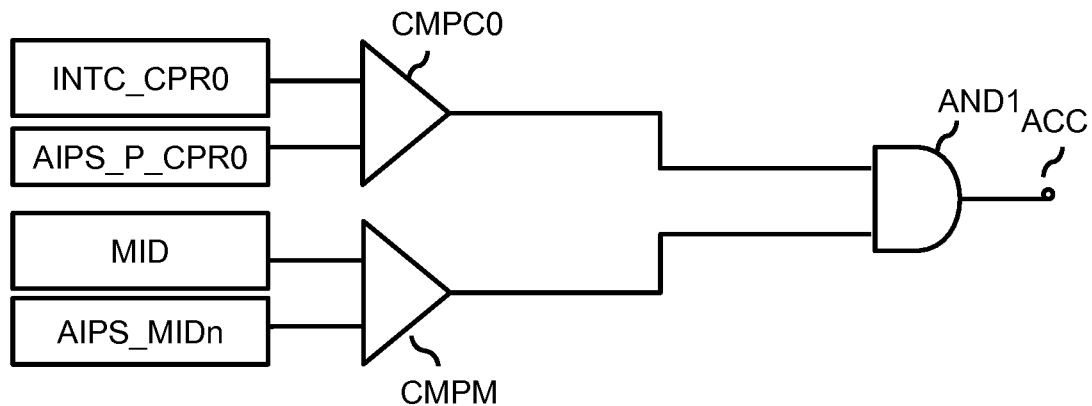
FIG. 2a and FIG. 2b schematically show embodiments of a part of the access control circuitry.
Figure 2B:
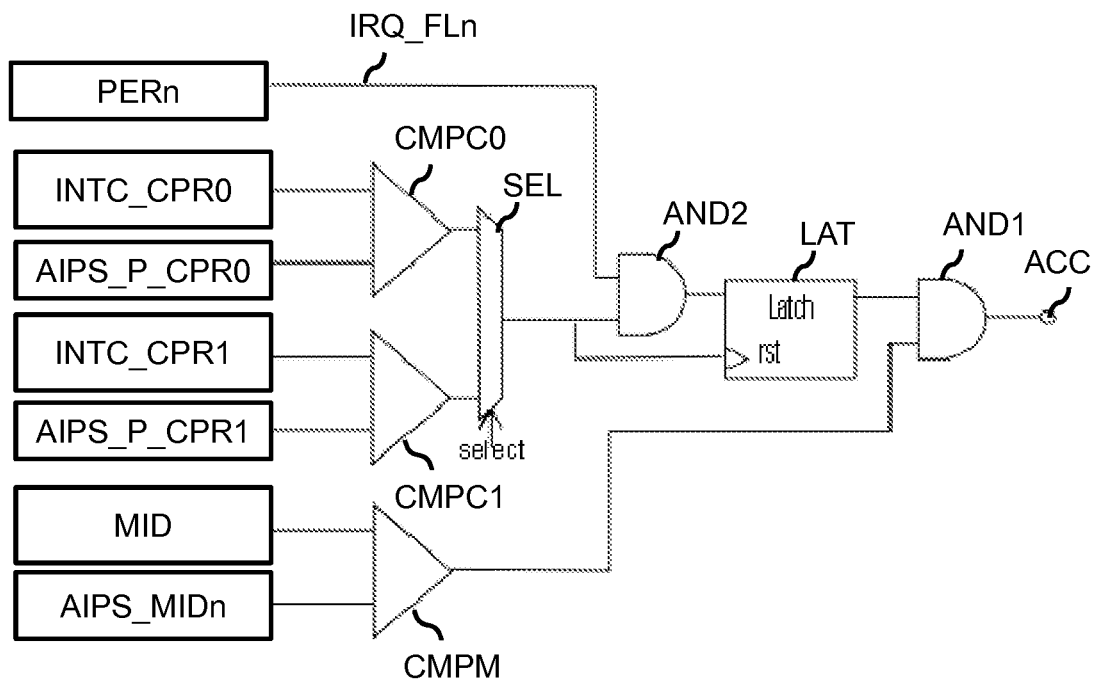

FIG. 2a and FIG. 2b schematically show embodiments of a part of the access control circuitry CIRC1 of FIG. 1 or of exemplary alternative embodiments of an access control circuitry. FIG. 2a and FIG. 2b will be described below when describing FIG. 3 in combination with FIG. 1.

Figure 3:
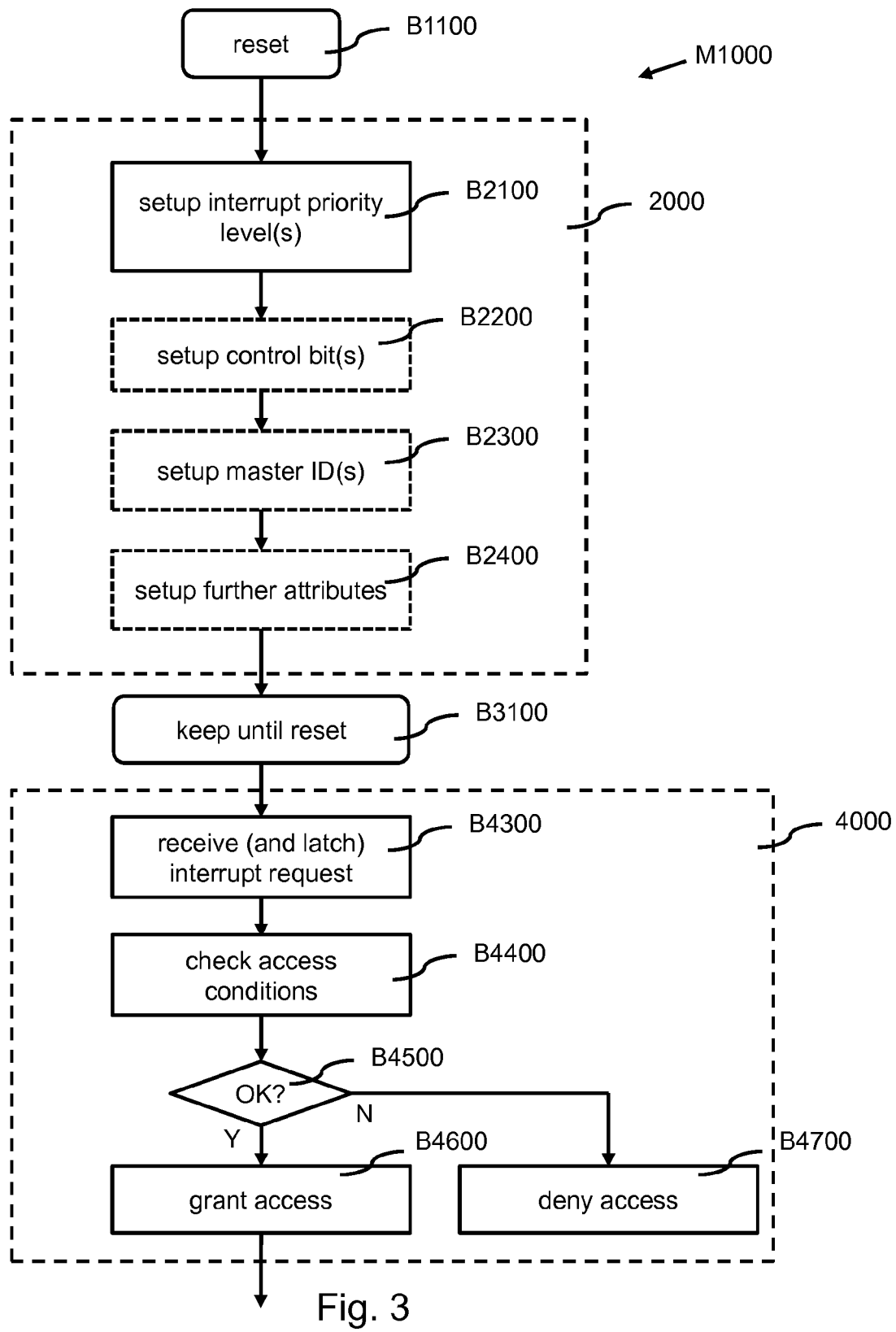
FIG. 3 schematically shows a method of access control.

FIG. 3 schematically shows a method M1000 that may be performed by the access control circuitry CIRC1 of FIG. 1 or by alternative embodiments of an access control circuitry. The method is described below with reference to FIG. 3 in combination with FIG. 1 and FIG. 2a and FIG. 2b, without being limited to the embodiment shown in FIG. 1 and/or FIG. 2a and FIG. 2b.

The method M1000 comprises a reset stage B1100, a setup stage 2000, a stable stage B3100, and an access control stage 4000.

The access control stage 4000 provides a method 4000 of controlling access by a master to a peripheral. The access control stage 4000 comprises receiving B4300 one or more interrupt request signals IRQ_FL0, IRQ_FL1, . . . , IRQ_FLn from one or more interrupt controllers associated with the peripherals. The one or more interrupt request signals IRQ_FL0, IRQ_FL1, . . . , IRQ_FLn have respective one or more interrupt priority levels. An interrupt signal may have two or more interrupt priority levels. The interrupt controller INTC retrieves level values of the interrupt priority levels from the respective interrupt request signals and stores the level values in respective registers as Current Priority Registers INTC_CPR0, INTC_CPR1, . . . , INTC_CPRn. Alternatively, the interrupt controller INTC may establish real-time signals having signal values indicative of the interrupt priority levels. In the following, where reference is made to as Current Priority Registers INTC_CPR0, INTC_CPR1, ..., INTC_CPRn, no limitation is intended as to the physical form in which the interrupt priority levels are indicated (registers, analogue signal, digital signal, or any other suitable way). The access control stage 4000 further comprises checking B4400 access conditions. Checking B4400 access conditions comprises comparing B4420 (also refer to FIG. 4) the one or more interrupt priority levels, e.g., as stored in the Current Priority Registers INTC_CPR0, INTC_CPR1, ..., INTC_CPRn, with respective one or more pre-established interrupt access levels AIPS_P_CPR-, AIPS_P_CPR1, ..., AIPS_P_CPRn, to obtain one or more interrupt level comparison results. The access control stage 4000 further comprises establishing B4500 whether an access condition is satisfied in dependence on at least the interrupt level comparison result. If the access condition is satisfied, the method comprises granting B4600 access. If the access condition is not satisfied (also referred to as "violated"), the method comprises denying B4700 access.

Advantages of the access control stage according to embodiments compared to known solutions may e.g. comprise that a commonly used 'top down' schemes, where the CPU "supervises" and controls all accesses, rely on functionally correct software running during normal CPU execution time. The access rights to the slave are in these known schemes completely controlled and configured from the master by the hierarchy of features (MPU, AIPS, register protection). As a result, errant software may have configured access in an unpredictable manner in known top-down systems. By letting the peripherals, which are not masters but act as slaves in the microcontroller, control access to themselves by master based upon interrupts indicating that access is required, the system may behave much more strictly in terms of permitting access. It may be considered as effectively narrowing the window of opportunity for a master to access a slave, and denying any access outside expected windows.

Figure 4:
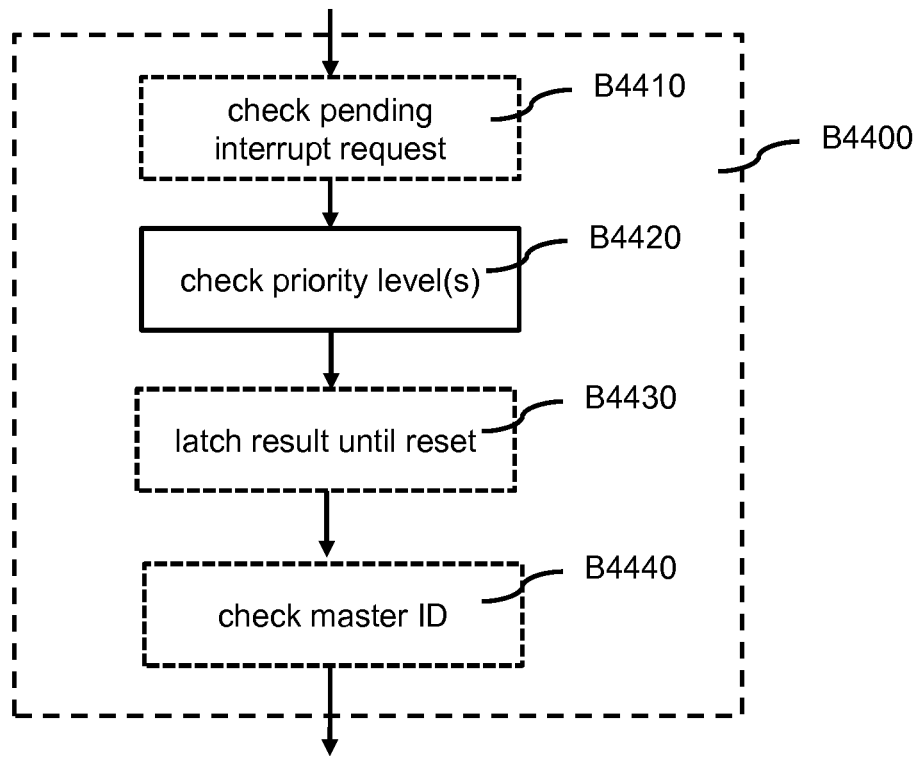
FIG. 4 and FIG. 5 show further embodiments of stages of the method.

FIG. 4 schematically shows a further embodiment of checking B4400 access conditions. FIG. 4 shows a method of checking B4400 access conditions comprising comparing B4420 the one or more interrupt priority levels, e.g., as stored in the Current Priority Registers INTC_CPR0, INTC_CPR1, ..., INTC_CPRn, with respective one or more pre-established interrupt access levels AIPS_P_CPR-, AIPS_P_CPR1, ..., AIPS_P_CPRn, to obtain one or more interrupt level comparison results.

The method further comprises checking B4440 the master ID, from establishing a master ID associated with the master, and comparing the master ID with a pre-established master ID to obtain a master comparison result. Establishing whether the access condition is satisfied is then performed in further dependence on at least the master comparison result. Herein, establishing the master ID comprises receiving the master ID from the master. Hereto, master IDs may be assigned to each of the masters during a setup phase, e.g. after an initial system startup or after a later reset. Each of the masters may be initialized in the setup phase with the respective master ID, allowing the master to provide the master ID to the access control circuitry during normal operation, as shown with reference signs MID0, MID1 and MID2, indicating master IDs for the respective masters CPU0, CPU1, CPU2. Alternatively may the access control circuitry CIRC1 identify for each activity by a master on any of the AHB busses AHB0 AHB1, AHB2 which master is active and accord a corresponding master ID internally in the access control circuitry.

An example of a circuitry for establishing whether the access condition is satisfied in further dependence on the master comparison result is shown in FIG. 2a: FIG. 2a schematically shows a circuitry comprising a master ID comparator CMPM arranged to receive the master ID from the master requesting an access to a peripheral and a pre-established master ID AIPS_MIDx. The pre-established master ID AIPS_MIDx may indicate the master that is allowed to access the peripheral PERn. The output of the master ID comparator CMPM is connected to a logical AND-element AND1, for performing a logical AND operation with the comparison result of a comparison by a first comparator CMPC0 of Current Priority Register INTC_CPR0 with a pre-established interrupt access level AIPS_P_CPR0. The logical AND-element AND1 provides an output ACC when the access condition is satisfied.

FIG. 4 further shows that embodiments of the method of checking B4400 access conditions may comprise establishing B4410 whether an interrupt request is pending, the interrupt request indicating that an interrupt requires servicing from the peripheral, and establishing whether the access condition is satisfied in further dependence on whether an interrupt request from the peripheral is pending.

In further embodiments, establishing B4410 whether an interrupt request is pending is performed only where a pendency requirement control setting indicates that a pending interrupt request is required for satisfying the access condition.

In an alternative further embodiment, establishing whether the access condition is satisfied is performed in further dependence on whether an interrupt request from the peripheral is pending only where a pendency requirement control setting indicates that a pending interrupt request is required for satisfying the access condition.

An example of a circuitry for establishing whether the access condition is satisfied in further dependence on whether an interrupt request from the peripheral is pending is shown in FIG. 2b: FIG. 2b schematically shows a circuitry comprising a second AND-logic element AND2 which performs a logical AND operation between an interrupt request signal IRQ_FLn and the comparison result of a comparison by a first comparator CMPC0 of Current Priority Register INTC_CPR0 with a pre-established interrupt access level AIPS_P_CPR0, or, depending on a status of a selector SEL operate with a selection signal select, a comparison by a second comparator CMPC1 of Current Priority Register INTC_CPR1 with pre-established interrupt access level AIPS_P_CPR1.

FIG. 4 further shows that establishing whether an interrupt request from the peripheral is pending may comprise receiving an interrupt request from the peripheral and latching B4430 the interrupt request until a latch reset is performed.

FIG. 2b schematically shows an example of a circuitry arranged to perform this latching. The example shown in FIG. 2b comprises a latch element LAT arranged to receive the result of the logical AND operation on its signal input and the comparison result on its reset input, and arranged to provide the latched result on its output to the first AND-logic element AND1. The latch element LAT may thus be arranged to hold the comparison result until an interrupt request has been serviced, as indicated by a change of the Current Priority Register(s). The first ANC-logic element AND1 provides an output ACC when the access condition is satisfied.

The method may further comprise performing the latch reset after an execution of an interrupt service routine associated with the interrupt request signal has been completed. Hereby, a negation of access rights due to a clearance of the pending interrupt request by the interrupt service routine, e.g., immediately after its start, may be prevented.

Figure 5:
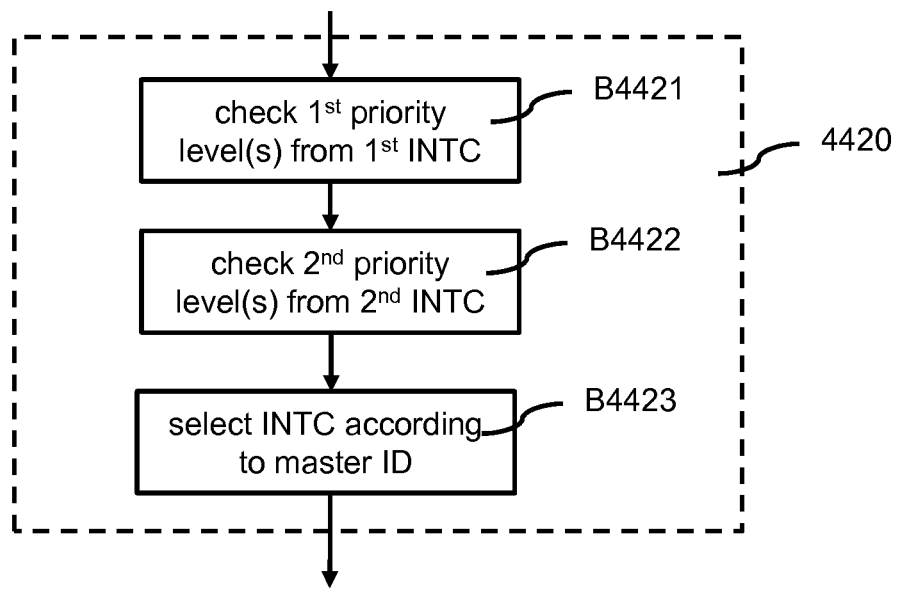

FIG. 5 schematically shows a further embodiment, described with further reference to FIG. 2b. In the further embodiment, one of the peripherals is arranged to provide two interrupt request signals IRQ_FL0, IRQ_FL1 associated with different interrupt priority levels.

In the method shown in FIG. 5, the receiving B4300 one or more interrupt request signals IRQ_FL0, IRQ_FL1 comprises receiving a first interrupt priority level INTC_CPR0 from a first interrupt controller associated with the peripheral and receiving a second interrupt priority INTC_CPR1 level from the first interrupt controller or from a second interrupt controller associated with the peripheral. The method further comprises comparing B4421 the first interrupt priority level INTC_CPR0 with a first pre-established further interrupt access level AIPS_P_CPR0 to obtain a first interrupt level comparison result. Hereto, the circuitry may, as shown in FIG. 2b, comprise a first comparator CMPC0. The method also comprises comparing B4422 the second interrupt priority level INTC_CPR1 with a second pre-established interrupt access level AIPS_P_CPR1 to obtain a second interrupt level comparison result. Hereto, the circuitry may, as shown in FIG. 2b, comprise a second comparator CMPC1. The method further comprises establishing a select signal for indicating whether the first interrupt priority level or the second interrupt priority level is associated with the access by the master to the peripheral, and selecting B4423 the first interrupt level comparison result or the second interrupt level comparison result in dependence on the select signal to obtain the interrupt level comparison result. For selecting B4423 the first interrupt level comparison result or the second interrupt level comparison result in dependence on the select signal, the circuitry may, as shown in FIG. 2b, comprise a selector SEL connected with its signal inputs to the outputs of the first comparator CMPC0 and the second comparator CMPC1, and arranged to receive the selection signal select on its select input.

The reset stage B1100, the setup stage 2000 and the stable stage B3100, that may be performed before the access control stage 4000 described above, are now described below. Reference is again made to FIG. 3.

The setup stage 2000 may comprise setting up B2100 the one or more pre-established interrupt access levels. Setting up B2100 the one or more pre-established interrupt access levels may comprise programming the one or more pre-established interrupt access levels in the access control circuitry CIRC1. Setting up B2100 may further comprise programming the peripherals and/or the interrupt controller to provide interrupt request signals and Current Priority Register(s) with user-defined signal levels.

Where the method checks (in the access control stage 4000) the master ID, the setup stage 2000 may comprise setting up B2300 the master ID associated with the master. The setting up B2300 the master ID associated with the master may comprise programming respective master IDs into the one or more masters. The setting up B2300 the master ID associated with the master may comprise programming the pre-established master ID indicating which master may access the peripheral into the access control circuitry CIRC1.

The setup stage 2000 may further comprises setting up B2200 one or more control bits. For example, where the method checks (in the access control stage 4000) whether an interrupt request from the peripheral is pending, the setup stage 2000 may comprises setting up B2200 the pendency requirement control setting from setting up one or more control bits to appropriate values. The setup stage 2000 may further comprise setting up B2400 further attributes.

Thus, a method of configuring a circuitry according to any one embodiment for executing a method according to any one embodiment may be provided, comprising—setting up the one or more pre-established interrupt access levels, and, optionally, setting up the master ID associated with the master, and, optionally, setting up the pendency requirement control setting.

FIG. 6 schematically shows an automotive body control (ABC) microcontroller UC2 as a specific example of the more general microcontroller UC1 shown in FIG. 1. The description is not repeated for corresponding features.

The ABC microcontroller UC2 comprises three CPUs CPU0, CPU1, CPU2 as masters, five peripherals PER0, PER1, PER2, PER3, PER4 and an access control circuitry CIRC2. The access control circuitry CIRC2 comprises an interrupt controller INTC arranged to receive the interrupt request signals IRQ_FL0, . . . , IRQ_FL4 associated with the five peripherals PER0, . . . , PER4.

A first peripheral PER0 is a Controller Area Network (CAN)-bus interface CAN_IF. The CAN-bus interface is arranged to interface to one or more CAN devices CAN_DEV over a CAN-bus, and may be arranged to send and/or receive data over the CAN-bus. Such CAN device may e.g. be an active node on a vehicle network.

A second peripheral PER1 is a Local Interconnect Network (LIN)-bus interface LIN_IF. The LIN-bus interface is arranged to interface to one or more LIN devices LIN_DEV over a LIN-bus, and may be arranged to send and/or receive data over the LIN-bus. Such LIN-bus device may e.g. be a slave device in a vehicle network.

A third peripheral PER2 is a General Purpose I/O (GPIO) interface GPIO_IF. The GPIO interface is arranged to connect directly to external devices GPIO_DEV via general purpose Input/Output (I/O) pins, schematically indicated as GPIOP.

A fourth peripheral PER3 is an Analogue-to-Digital Convertor (ADC) ADC. The ADC may be arranged to measure a signal level of an analogue signal, such as the output from a sensor within the vehicle, and to convert the measure into a digital value, allowing one of the CPUs CPU0, CPU1, CPU2 to further process it.

A fifth peripheral PER4 is one or more timers TIM. Timers TIM may be arranged to provide a measurement of time between a start moment and a stop moment and to provide the measurement to another unit of the ABC microcontroller UC2, such as one of the CPUs CPU0, CPU1, CPU2 or to indicate this measurement on an output pin of the ABC microcontroller UC2. Hereto, a timer TIM may be started and stopped by one of the CPUs CPU0, CPU1, CPU2. The timer TIM may e.g. be used to generate a sequence of pulses on a pin to flash an indicator light in a vehicle at a defined rate.

Each of the peripherals may have a memory for, for example, storing control parameters and/or a measurement result (e.g., the digital value obtained by the ADC) in a random-access memory or as registers. The memory may be physically implemented as, for example, a private memory, or have an allocated space in common memory. The memories for all five peripherals are indicated as MCAN, MLIN, MGPIO, MADC and MTIM.

Figure 7:
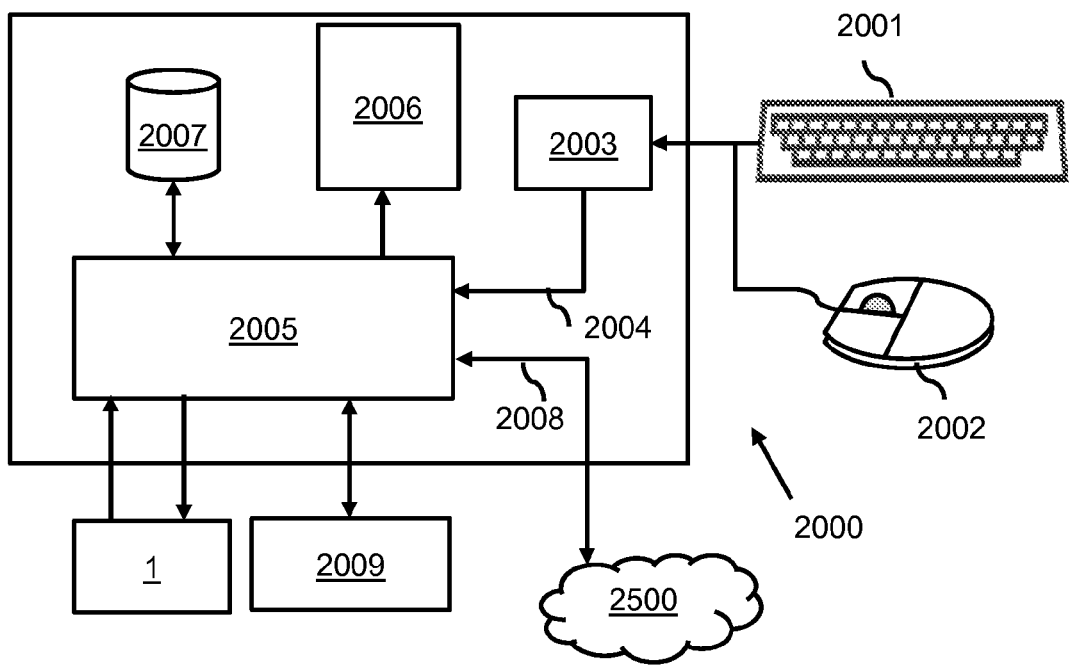
FIG. 7 schematically shows an exemplary user interaction system using an embodiment of a system.

FIG. 7 schematically shows an exemplary user interaction system 2000 having a programmable processor 2005. The user interaction system 2000 is shown to be a personal computer, but may be any type of suitable user interaction system 2000. The programmable processor 2005 is arranged to be able to communicate with a programmable target (not illustrated). The programmable target may for example be a microcontroller UC1 according to an embodiment as described with reference to FIG. 1, a microcontroller UC2 according to an embodiment as described with reference to FIG. 6, or another programmable device comprising or cooperating with one or more masters, one or more peripherals and an access gating circuitry according to an embodiment. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007. The user interaction system 2000 may further comprise a communication channel 2008 allowing the processor 2005 to connect to an external cloud 2500 for communicating with other devices in the cloud. The external cloud may e.g. be the Internet. The processor 2005 may also be arranged to retrieve information from the storage unit 2007, or from another device in the cloud 2500, and generate the memory trace from combining the record of static memory address information and the record of dynamic memory address information offline by the processor 2005. The processor 2005 may be capable to read, using the data I/O device 2009, a computer readable medium comprising a program code 1 executable on a programmable target. The processor 2005 may be capable to read, using the data I/O device 2009, a computer readable medium comprising a computer program product comprising instructions for causing the system 2000 to perform a method of generating an instrumented code from a program code 1 executable on the programmable target. The processor 2005 may be capable to read, using the data I/O device 2009. A computer readable medium comprising a computer program product comprising instructions for causing the system 2000 to perform a method of controlling access by a master to a peripheral, from one or more interrupt controllers associated with the peripheral, comparing the one or more interrupt priority level with respective one or more pre-established interrupt access levels to obtain an interrupt level comparison result, establishing whether an access condition is satisfied in dependence on at least the interrupt level comparison result, and if the access condition is satisfied, granting access. The method may further comprise, if the access condition is not satisfied, denying access. The method may further establishing a master ID associated with the master, and comparing the master ID with a pre-established master ID to obtain an master comparison result, and establishing whether the access condition is satisfied may be performed in further dependence on at least the master comparison result. The method may further comprise establishing whether an interrupt request is pending, the interrupt request indicating that an interrupt requires servicing from the peripheral, and establishing whether the access condition is satisfied may be performed in further dependence on whether an interrupt request from the peripheral is pending.

Figure 8:
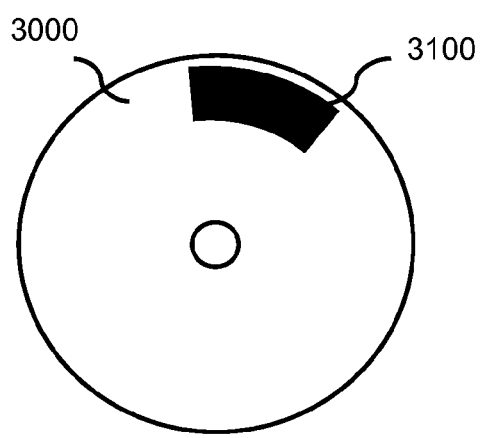
FIG. 8 and FIG. 9 schematically show examples of an embodiment of a computer readable medium comprising a computer program.

FIG. 8 shows a computer readable medium 3000 comprising a computer program product 3100, the computer program product 3100 comprising instructions for causing a processor apparatus to perform a method of controlling access by a master to a peripheral, according to an embodiment. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 8 as an optical disc, the computer readable medium 3000 may be any suitable computer readable medium, such as a hard disk, solid state memory, flash memory, etc., and may be non-recordable or recordable. The computer program product 3100 comprises instructions for causing a processor system to perform a method of controlling access by a master to a peripheral, the method comprising: receiving one or more interrupt priority levels from one or more interrupt controllers associated with the peripheral, comparing the one or more interrupt priority level with respective one or more pre-established interrupt access levels to obtain an interrupt level comparison result, establishing whether an access condition is satisfied in dependence on at least the interrupt level comparison result, and if the access condition is satisfied, granting access. The method may further comprise, if the access condition is not satisfied, denying access. The method may further establishing a master ID associated with the master, and comparing the master ID with a pre-established master ID to obtain an master comparison result, and establishing whether the access condition is satisfied may be performed in further dependence on at least the master comparison result. The method may further comprise establishing whether an interrupt request is pending, the interrupt request indicating that an interrupt requires servicing from the peripheral, and establishing whether the access condition is satisfied may be performed in further dependence on whether an interrupt request from the peripheral is pending.

Figure 9:
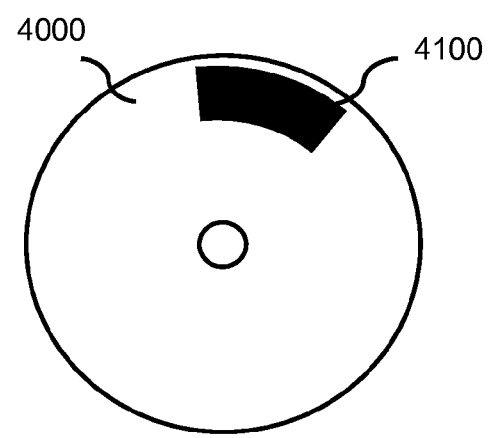

FIG. 9 shows another computer readable medium 4000 comprising another computer program product 4100, the computer program product 4100 comprising instructions for causing a processor apparatus to configure a circuitry for controlling access by a master to a peripheral according to an embodiment. The computer program product 4100 may be embodied on the computer readable medium 4000 as physical marks or by means of magnetization of the computer readable medium 4000. However, any other suitable embodiment is conceivable as well. Furthermore, it will be appreciated that, although the computer readable medium 4000 is shown in FIG. 9 as an optical disc, the computer readable medium 4000 may be any suitable computer readable medium, such as a hard disk, solid state memory, flash memory, etc., and may be non-recordable or recordable. The computer program product 4100 comprises instructions for causing a processor system to perform a method of configuring a circuitry, the circuitry being according to an embodiment for executing any method of controlling access by a master to a peripheral as defined above, the method of configuring a circuitry comprising setting up the one or more pre-established interrupt access levels. Where appropriate, the method may comprise setting up the master ID associated with the master. Where appropriate, the method may comprise setting up the pendency requirement control setting.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one or more signals. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of UC1 or UC2 are circuitry located on a single integrated circuit or within a same device. Alternatively, system UC1 or UC2 may include any number of separate integrated circuits or separate devices interconnected with each other. For example, timer TIM may be located on a same integrated circuit as masters CPU0, CPU1 and CPU2 or on a separate integrated circuit or located within another peripheral or slave discretely separate from other elements of system UC2. Peripherals PER1, PER2, PER3, PER4 and PER5, some of which forming I/O circuitry such as CAN_IF, LIN_IF and GPIO_IF, may also be located on separate integrated circuits or devices. Also for example, system UC1 or UC2 or portions thereof may be soft or code representations of physical circuitry or of logical representations convertible into physical circuitry. As such, system UC1 or UC2 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system UC1 or UC2, for example, from computer readable media such as memory 3000 or other media on other computer systems. Such computer readable media may be permanently, removably or remotely coupled to an information processing system such as system 2000. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices. For example, the CAN-bus interface CAN_IF and the masters CPU0, CPU0, CPU1 may be combined in a single semiconductor device, or, alternatively, be distributed over multiple semiconductor devices. As another example, the ADC PER4 may be part of microcontroller UC2, or an external device connected to and cooperating with the microcontroller UC2.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of controlling access by a master to a peripheral, the method comprising:
  receiving one or more interrupt priority levels from one or more interrupt controllers associated with the peripheral;
  comparing the one or more interrupt priority level with respective one or more pre-established interrupt access levels to obtain an interrupt level comparison result;
  establishing whether an interrupt request from the peripheral is pending, the interrupt request indicating that the peripheral requires servicing, wherein in establishing whether an interrupt request is pending the method further comprises:
    receiving an interrupt request signal from the peripheral; and
    latching, after an execution of an interrupt service routine associated with the interrupt request signal has been completed, the interrupt request signal until a latch reset is performed;
establishing whether an access condition is satisfied in dependence on at least the interrupt level comparison result and on whether the interrupt request from the peripheral is pending; and
if the access condition is satisfied, granting the master access to the peripheral.

2. The method according to claim 1, further comprising, if the access condition is not satisfied, denying the master access to the peripheral.

3. The method according to claim 1 the method further comprising:
establishing a master ID associated with the master; and
comparing the master ID with a pre-established master ID to obtain a master comparison result,
wherein establishing whether the access condition is satisfied is performed in further dependence on at least the master comparison result.

4. The method according to claim 3, the method further comprising:
setting up the one or more pre-established interrupt access levels; and
setting up the master ID associated with the master.

5. The method according to claim 3, wherein establishing the master ID comprises receiving the master ID from the master.

6. The method according to claim 1, wherein establishing whether the access condition is satisfied is performed in further dependence on whether an interrupt request from the peripheral is pending only where a pendency requirement control setting indicates that a pending interrupt request is required for satisfying the access condition.

7. The method according to claim 6, further comprising setting up the pendency requirement control setting.

8. The method according to claim 1, the receiving one or more interrupt priority levels from one or more interrupt controllers comprising:
receiving a first interrupt priority level from a first interrupt controller associated with the peripheral;
receiving a second interrupt priority level from the first interrupt controller or from a second interrupt controller associated with the peripheral;
comparing the first interrupt priority level with a first pre-established interrupt access level to obtain a first interrupt level comparison result;
comparing the second interrupt priority level with a second pre-established interrupt access level to obtain a second interrupt level comparison result;
establishing a select signal for indicating whether the first interrupt priority level or the second interrupt priority level is associated with the access by the master to the peripheral; and
selecting the first interrupt level comparison result or the second interrupt level comparison result in dependence on the select signal to obtain the interrupt level comparison result.

9. The method according to claim 1, the method being executed in a microcontroller, the microcontroller comprising one or more masters, one or more peripherals, and an access control circuitry comprising one or more interrupt controllers associated with the one or more peripherals,
at least one of the one or more masters being arranged to access at least one of the one or more peripherals via the access control circuitry,
the at least one of the one or more peripherals being arranged to provide an interrupt request signal to the associated interrupt controller, for allowing the interrupt controller to signal the at least one of the one or more masters that an access can be performed where access is granted.

10. A circuitry comprising:
a master;
one or more peripherals; and
an access control circuitry comprising one or more interrupt controllers associated with the one or more peripherals, the access control circuitry being arranged to:
receive one or more interrupt priority levels from one or more interrupt controllers associated with one of the one or more peripherals;
compare the one or more interrupt priority level with respective one or more pre-established interrupt access levels to obtain an interrupt level comparison result;
establish whether an interrupt request is pending, the interrupt request indicating that an interrupt requires servicing from one of the one or more peripherals;
establish whether an access condition is satisfied in dependence on at least the interrupt level comparison result and on whether the interrupt request from the one or more peripherals is pending; and
if the access condition is satisfied, grant the master access to the one or more peripherals;
wherein, when access is granted to the master, accesses at least one of the one or more peripherals via the access control circuitry; and
wherein at least one peripheral allows access to the at least one peripheral by the master, and provides one or more interrupt request signals with one or more interrupt priority levels to the associated interrupt controller for allowing the interrupt controller to control access by the master to the at least one peripheral.

11. The circuitry according to claim 10, wherein the access control circuitry is arranged to signal the master that an access can be performed where access is granted.

12. The circuitry according to claim 11, wherein the access control circuitry is arranged to signal the master that an access can be performed where access is granted by providing the one or more interrupt request signals as master interrupt signals to the master.

13. The circuitry according to claim 10, the master comprises at least one CPU.

14. A device comprising a circuitry according to claim 10.

15. The device according to claim 14, the device comprising or being a microcontroller.

* * * * *